(12) United States Patent
Ward

(10) Patent No.: US 12,097,952 B2
(45) Date of Patent: Sep. 24, 2024

(54) COMPOSITE STRUCTURE AND METHOD FOR FORMING SAME

(71) Applicant: Rohr, Inc., Chula Vista, CA (US)

(72) Inventor: Stephen H. Ward, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 88 days.

(21) Appl. No.: 17/473,268

(22) Filed: Sep. 13, 2021

(65) Prior Publication Data
US 2023/0077607 A1 Mar. 16, 2023

(51) Int. Cl.
*B64C 3/26* (2006.01)
*B64C 3/18* (2006.01)

(52) U.S. Cl.
CPC ............ *B64C 3/26* (2013.01); *B64C 3/185* (2013.01); *B64C 3/187* (2013.01)

(58) Field of Classification Search
CPC ....... B64C 3/18; B64C 3/185; B64C 3/18726; B64C 3/187; B64C 3/26
See application file for complete search history.

(56) References Cited

U.S. PATENT DOCUMENTS

| | | | |
|---|---|---|---|
| 9,429,024 B2 | 8/2016 | Nagle | |
| 10,450,054 B2 * | 10/2019 | Kooiman | B64C 3/26 |
| 2007/0011970 A1 | 1/2007 | Hethcock | |
| 2009/0001218 A1 * | 1/2009 | Munoz Lopez | B64C 3/18 244/124 |
| 2014/0284431 A1 | 9/2014 | Grankaell | |
| 2016/0075429 A1 * | 3/2016 | Fong | B29C 70/302 156/182 |
| 2019/0217942 A1 | 7/2019 | Kooiman | |
| 2020/0269987 A1 | 8/2020 | Gleize | |

FOREIGN PATENT DOCUMENTS

EP 3210882 A1 8/2017

OTHER PUBLICATIONS

EP search report for EP22195464.7 dated Feb. 6, 2023.

* cited by examiner

*Primary Examiner* — Timothy D Collins
*Assistant Examiner* — Eric Acosta
(74) *Attorney, Agent, or Firm* — Getz Balich LLC

(57) ABSTRACT

A composite structure includes a first composite skin and a second composite skin spaced from the first composite skin. The first composite skin and the second composite skin define a longitudinal cavity therebetween. The composite structure further includes a plurality of spars located in the longitudinal cavity and laterally spaced from one another. The plurality of spars extends between and connects the first composite skin and the second composite skin. The composite structure further includes at least one rib located within the longitudinal cavity between a first spar and a second spar of the plurality of spars. The first spar is laterally adjacent the second spar. The at least one rib is in contact with the first composite skin, the second composite skin, the first spar and the second spar.

5 Claims, 6 Drawing Sheets

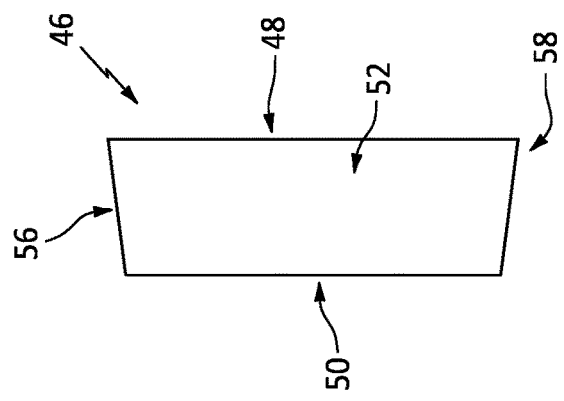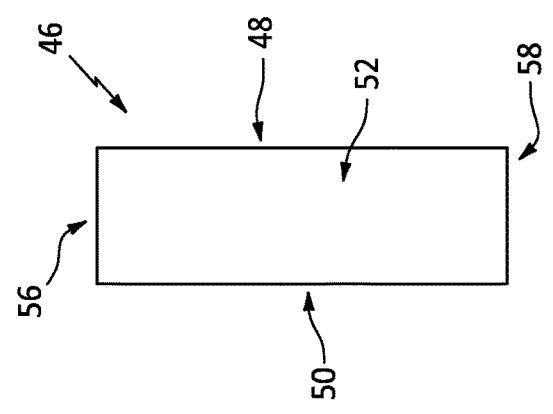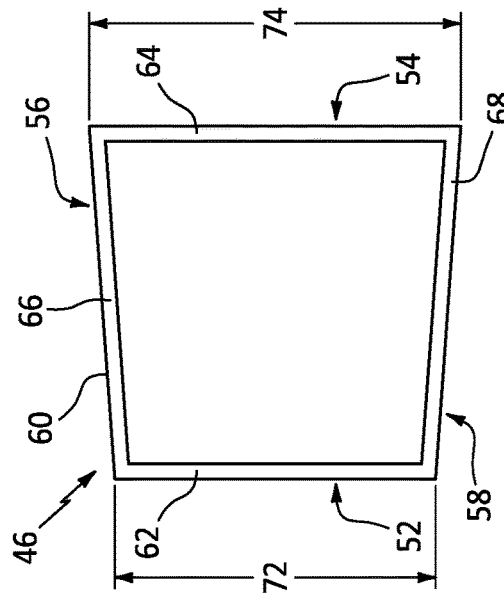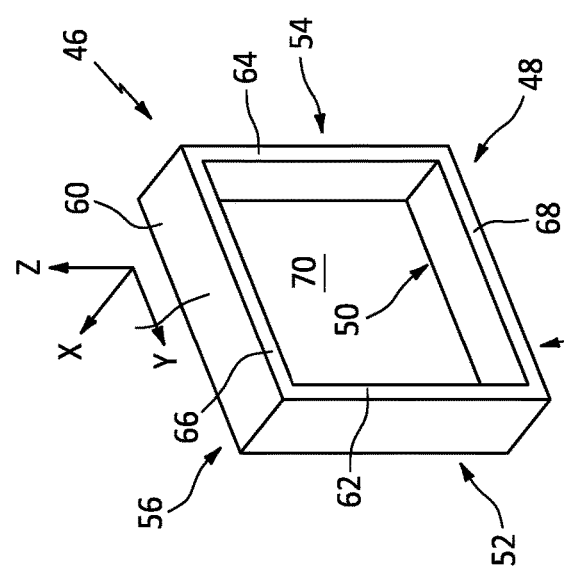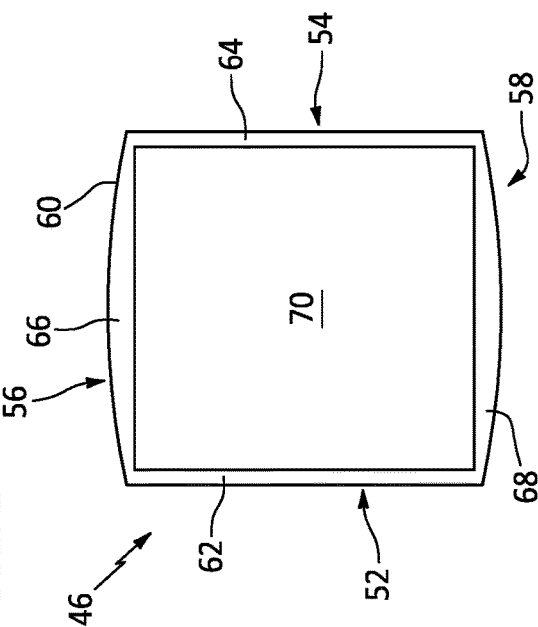

COMPOSITE STRUCTURE AND METHOD FOR FORMING SAME

BACKGROUND

1. Technical Field

This disclosure relates generally to composite structures, and more particularly to composite structures for aircraft and methods for forming composite structures for aircraft.

2. Background Information

Composite materials are frequently used in the aerospace industry for a diverse array of structural and dynamic aerostructural applications because of the strength-to-weight advantage provided by composite materials. Various types of molding techniques may be used to construct composite structures or components for an aircraft. For example, resin pressure molding (RPM) techniques and Same Qualified Resin Transfer Molding (SQRTM) techniques may be used to form composite structures for aerospace applications. However, composite structures formed by certain molding techniques may require internal stiffening components to provide structural support for the composite structures. Internal stiffening components, such as ribs, may conventionally be mechanically fastened within composite structures. However, mechanically fastening the ribs can be time consuming and adds a substantial amount of weight to the assembled composite structure. Moreover, the use of certain stiffening components can interfere with molding techniques used to form the composite structure and/or obstruct tooling used in composite structure formation. Accordingly, what is needed are improved composite structures and methods of forming composite structures which address one or more of the above-noted concerns.

SUMMARY

It should be understood that any or all of the features or embodiments described herein can be used or combined in any combination with each and every other feature or embodiment described herein unless expressly noted otherwise.

According to an aspect of the present disclosure, a composite structure includes a first composite skin and a second composite skin spaced from the first composite skin. The first composite skin and the second composite skin define a longitudinal cavity therebetween. The composite structure further includes a plurality of spars located in the longitudinal cavity and laterally spaced from one another. The plurality of spars extends between and connects the first composite skin and the second composite skin. The composite structure further includes at least one rib located within the longitudinal cavity between a first spar and a second spar of the plurality of spars. The first spar is laterally adjacent the second spar. The at least one rib is in contact with the first composite skin, the second composite skin, the first spar and the second spar.

In any of the aspects or embodiments described above and herein, the first composite skin and the second composite skin may extend between a first longitudinal end and a second longitudinal end opposite the first longitudinal end and the plurality of spars may extend in a direction extending from the first longitudinal end toward the second longitudinal end.

In any of the aspects or embodiments described above and herein, the first spar and the second spar may define a longitudinal sub-cavity therebetween and the first composite skin and the second composite skin may define an opening of the longitudinal sub-cavity at the first longitudinal end.

In any of the aspects or embodiments described above and herein, the longitudinal sub-cavity may be tapered such that a cross-sectional area of the longitudinal sub-cavity decreases in a first taper direction from the opening toward the second longitudinal end.

In any of the aspects or embodiments described above and herein, a lateral width of the at least one rib may be tapered such that the lateral width decreases in a second taper direction from a first longitudinal side of the at least one rib to a second longitudinal side of the at least one rib opposite the first longitudinal side.

In any of the aspects or embodiments described above and herein, the at least one rib may include a first lateral segment, a second lateral segment spaced from the first lateral segment, and a first vertical segment and a second vertical segment extending between and connecting the first lateral segment and the second lateral segment. The at least one rib may define a longitudinal passage between the first lateral segment, the second lateral segment, the first vertical segment, and the second vertical segment. The first lateral segment may be in contact with the first spar and the second lateral segment may be in contact with the second spar.

In any of the aspects or embodiments described above and herein, the first lateral segment has a first height and the second lateral segment has a second height which may be different than the first height.

In any of the aspects or embodiments described above and herein, the first composite skin and the second composite skin may define a unitary composite skin.

According to another aspect of the present disclosure, a composite structure includes a first composite skin and a second composite skin spaced from the first composite skin. The first composite skin and the second composite skin define a longitudinal cavity therebetween. The composite structure further includes a plurality of spars located in the longitudinal cavity and laterally spaced from one another. The plurality of spars extends between and connects the first composite skin and the second composite skin. The composite structure further includes at least one rib located within the longitudinal cavity between a first spar and a second spar of the plurality of spars. The first spar is laterally adjacent the second spar. The at least one rib includes a first lateral segment, a second lateral segment spaced from the first lateral segment, and a first vertical segment and a second vertical segment extending between and connecting the first lateral segment and the second lateral segment. The at least one rib defines a longitudinal passage between the first lateral segment, the second lateral segment, the first vertical segment, and the second vertical segment. The first lateral segment is in contact with the first spar and the second lateral segment is in contact with the second spar.

In any of the aspects or embodiments described above and herein, the first vertical segment may be in contact with the first composite skin and the second vertical segment may be in contact with the second composite skin.

In any of the aspects or embodiments described above and herein, one or both of the first vertical segment and the second vertical segment may include a curved exterior surface.

According to another aspect of the present disclosure, a method for forming a composite structure includes positioning a first composite skin, a second composite skin, and a plurality of spars so that the second composite skin is spaced from the first composite skin and the first composite skin and the second composite skin define a longitudinal cavity therebetween, and so that the plurality of spars are located in the longitudinal cavity and laterally spaced from one another with the plurality of spars extending between and connecting the first composite skin and the second composite skin. The method further includes curing the first composite skin, the second composite skin, and the plurality of spars and inserting at least one rib into the longitudinal cavity between a first spar and a second spar of the plurality of spars, with the first spar laterally adjacent the second spar, so that the at least one rib is in contact with the first composite skin, the second composite skin, the first spar, and the second spar.

In any of the aspects or embodiments described above and herein, the first composite skin and the second composite skin may extend between a first longitudinal end and a second longitudinal end opposite the first longitudinal end and the plurality of spars may extend in a direction extending from the first longitudinal end toward the second longitudinal end.

In any of the aspects or embodiments described above and herein, the plurality of spars may define at least one longitudinal sub-cavity with each longitudinal sub-cavity of the at least one longitudinal sub-cavity located between each adjacent pair of spars of the plurality of spars and the first composite skin and the second composite skin may define an opening of the at least one longitudinal sub-cavity at the first longitudinal end.

In any of the aspects or embodiments described above and herein, the method may further include inserting a mandrel into one or more of the at least one longitudinal sub-cavity, prior to the step of curing the first composite skin, the second composite skin, and the plurality of spars.

In any of the aspects or embodiments described above and herein, the step of inserting the at least one rib into the longitudinal cavity may be performed subsequent to curing the first composite skin, the second composite skin, and the plurality of spars.

In any of the aspects or embodiments described above and herein, the at least one longitudinal sub-cavity may be tapered such that a cross-sectional area of the at least one longitudinal sub-cavity decreases in a taper direction from the opening toward the second longitudinal end.

In any of the aspects or embodiments described above and herein, the step of inserting the at least one rib into the longitudinal cavity may include inserting the at least one rib into the at least one longitudinal sub-cavity, in the taper direction, until the at least one rib contacts the first composite skin, the second composite skin, the first spar, and the second spar.

In any of the aspects or embodiments described above and herein, the at least one rib may include a first lateral segment, a second lateral segment spaced from the first lateral segment, and a first vertical segment and a second vertical segment extending between and connecting the first lateral segment and the second lateral segment. The at least one rib may define a longitudinal passage between the first lateral segment, the second lateral segment, the first vertical segment, and the second vertical segment.

In any of the aspects or embodiments described above and herein, the method may further include applying an adhesive to an exterior surface of the at least one rib prior to the step of inserting the at least one rib into the longitudinal cavity.

The present disclosure, and all its aspects, embodiments and advantages associated therewith will become more readily apparent in view of the detailed description provided below, including the accompanying drawings.

BRIEF DESCRIPTION OF THE DRAWINGS

FIG. 2 illustrates a perspective view of an exemplary rib, in accordance with one or more embodiments of the present disclosure.

FIGS. 3A-B illustrate side views of exemplary ribs, in accordance with one or more embodiments of the present disclosure.

FIGS. 4A-B illustrate front views of exemplary ribs, in accordance with one or more embodiments of the present disclosure.

DETAILED DESCRIPTION

In accordance with various aspects of the present disclosure, apparatuses, systems, and methods are described in connection with a component of, for example, an aircraft. In some embodiments, the component may be a composite structure such as, but not limited to, an aircraft control structure, an airfoil, or a wing of an aircraft. In some embodiments, a composite structure of the present disclosure may for all or a portion of a stabilizer or a stabilator of an aircraft. However, it should be understood that the composite structures of the present disclosure are not limited to utilization in an aircraft or for aerospace applications and may alternatively be used for other applications.

Figure 1:
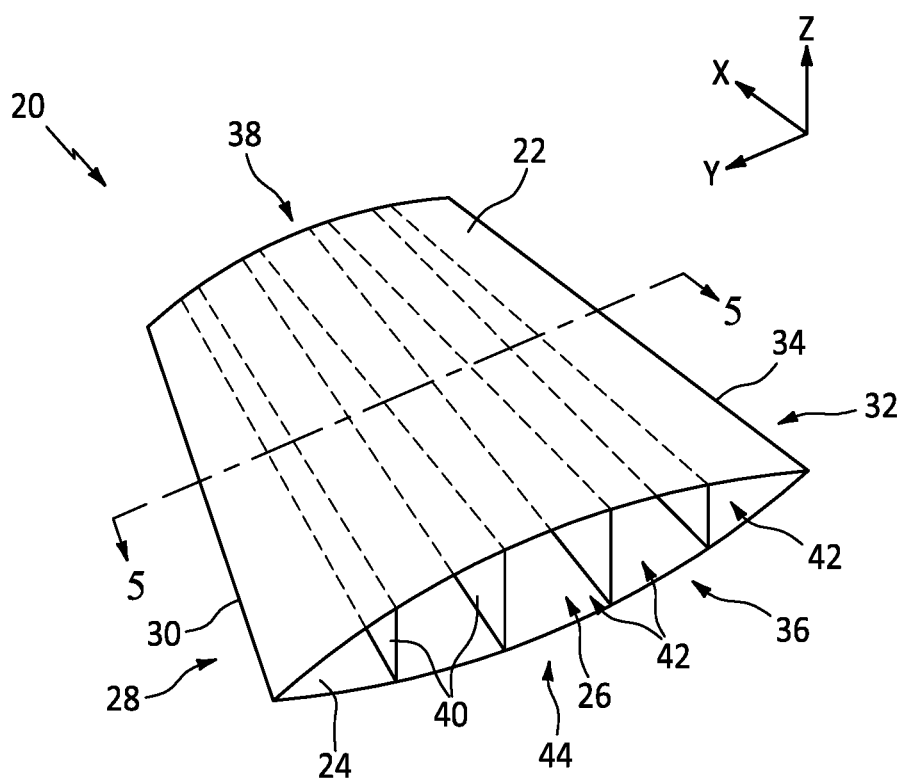
FIG. 1 illustrates a perspective view of a composite structure, in accordance with one or more embodiments of the present disclosure.

Referring to FIG. 1, a perspective view of a composite structure 20 is illustrated. The composite structure 20 includes at least one composite skin, for example, a first composite skin 22 and a second composite skin 24, as shown in FIG. 1. The composite structure 20 of the present disclosure is not limited to any particular number of composite skins. The first composite skin 22 is spaced from the second composite skin 24 so as to define a cavity 26 therebetween. As shown in FIG. 1, the cavity 26 may extend longitudinally within the composite structure 20. In some embodiments, the first composite skin 22 and the second composite skin 24 may contact or be fixedly mounted to one another. As shown in FIG. 1, the first composite skin 22 and the second composite skin 24 are mounted to one another at a first lateral end 28 of the composite structure 20 to define a first edge 30 where the first composite skin 22 contacts the second composite skin 24. Similarly, the first composite skin 22 and the second composite skin 24 are mounted to one another at a second lateral end 32 of the composite structure 20, opposite the first lateral end 28, to define a second edge 34 wherein the first composite skin 22 contacts the second composite skin 24. The first composite skin 22 and the second composite skin 24 may extend between a first longitudinal end 36 and a second longitudinal end 38 opposite the first longitudinal end 36. In some embodiments, the first edge 30 and the second edge 32 may extend all or substantially all of a longitudinal distance from the first longitudinal end 36 to the second longitudinal end 38. In some embodiments the first composite skin 22 and the second composite skin 24 may define a unitary composite skin. The term "unitary" as used herein with respect to the first composite skin 22 and the second composite skin 24 means a single component, wherein the first composite skin 22 and the second composite skin 24 are an inseparable body (e.g., formed of a single material).

The configuration of the composite structure 20 is discussed above to assist in the description of the present disclosure. It should be understood, however, that composite structures may have a variety of different shapes, forms, and configurations and the present disclosure is not limited to the particular exemplary configuration of the composite structure 20 described above. As used herein, the terms "longitudinal," "lateral," and "vertical" may be used to refer to the respective x-axis, y-axis, and z-axis as shown, for example, in FIG. 1 and should not be understood to refer to any orientation or attitude of the composite structure 20 (e.g., in use on an aircraft).

The composite structure 20 includes a plurality of spars 40 located in the cavity 26 and laterally spaced from one another within the cavity 26. Each spar of the plurality of spars 40 extends between and connects the first composite skin 22 and the second composite skin 24 in order to provide structural support for the composite structure 20. As shown in FIG. 1, the plurality of spars 40 may extend in a substantially longitudinal direction along all or a portion of a longitudinal distance between the first longitudinal end 36 and the second longitudinal end 38. Each adjacent pair of spars of the plurality of spars 40 may define a sub-cavity 42 therebetween. Sub-cavities 42 may additionally be defined, for example, between a spar of the plurality of spars 40 and adjacent portions of the first composite skin 22 and/or the second composite skin 24. As shown in FIG. 1, the sub-cavities 42 may extend in a substantially longitudinal direction between the first longitudinal end 36 and the second longitudinal end 38. In some embodiments, the plurality of spars 40 may be made from a composite material which may be similar to a composite material used to form the first composite skin 22 and the second composite skin. In some other embodiments, the plurality of spars 40 may alternatively be formed from another material such as a metal, polymer, ceramic, or other suitable material which may preferably be lightweight and provide sufficient structural strength to the composite structure 20.

The composite structure 20 may include at least one opening 44 between the cavity 26 and an exterior of the composite structure 20. For example, the first composite skin 22 and the second composite skin 24 may define the opening 44 therebetween at one or both of the first longitudinal end 36, as shown in FIG. 1, and the second longitudinal end 38. Accordingly, the opening 44 may allow access to one or more sub-cavities 42 from the exterior of the composite structure 20 as shown, for example, in FIG. 1.

Referring to FIGS. 1-4, the composite structure 20 includes at least one rib 46 configured to provide further support to the composite structure 20. As shown in FIG. 2, the at least one rib 46 may include a first longitudinal side 48 and a second longitudinal side 50 opposite the first longitudinal side 48. The at least one rib 46 may include a first lateral side 52 and a second lateral side 54 opposite the first lateral side 52. Each of the first lateral side 52 and the second lateral side 54 may extend between the first longitudinal side 48 and the second longitudinal side 50. The at least one rib 46 may include a first vertical side 56 and a second vertical side 58 opposite the first vertical side 56. Each of the first vertical side 56 and the second vertical side 58 may extend between the first longitudinal side 48 and the second longitudinal side 50 as well as the first lateral side 52 and the second lateral side 54. The at least one rib 46 includes an exterior surface 60 defined, for example, by the first and second lateral sides 52, 54 and the first and second vertical sides 56, 58. In some embodiments, the at least one rib 46 may be made from a composite material. In some other embodiments, the at least one rib 46 may alternatively be formed from another material such as a metal, polymer, ceramic, or other suitable material which may preferably be lightweight and provide sufficient structural strength to the composite structure 20.

In some embodiments, the at least one rib 46 may include a first lateral segment 62 which includes the first lateral side 52 and a second lateral segment 64, spaced from the first lateral segment 62, which includes the second lateral side 54. The at least one rib 46 may further include a first vertical segment 66 which includes the first vertical side 56 and a second vertical segment 68, spaced from the first vertical segment 66, which includes the second vertical side 58. The first vertical segment 66 and the second vertical segment 68 may extend between and connect the first lateral segment 62 and the second lateral segment 64. Accordingly, the at least one rib 46 may define a longitudinal passage 70 therethrough between the lateral segments 62, 64 and the vertical segments 66, 68, which may provide for a reduction in weight of the at least one rib 46 and, therefore, a reduction in weight of the composite structure 20. In some embodiments, for example, where additional structural strength may be required, the at least one rib 46 may be formed without the longitudinal passage 70 therethrough.

FIGS. 3A and 3B include side views of various embodiments of the at least one rib 46 showing, for example, the first lateral side 52. However, it should be understood that the configurations shown in FIGS. 3A and 3B may also be applicable to some or all of the other sides 54, 56, 58 of the at least one rib 46. As shown in FIG. 3A, in some embodiments, the first lateral side 52 may have a substantially rectangular cross-sectional shape. In some other embodiments, the first lateral side 52 may alternatively have a shape configured to correspond to a counterpart shape of the first composite skin 22, the second composite skin 24, and/or the plurality of spars 40 with which the at least one rib 46 is configured to mate, as will be discussed in further detail. For example, the at least one rib 46 may be tapered such that a lateral width and/or a vertical height of the at least one rib 46 changes (e.g., decreases) in a direction from the first longitudinal side 48 to the second longitudinal side 50.

FIGS. 4A and 4B include front views of various embodiments of the at least one rib 46. As shown in FIG. 4A, in some embodiments, the exterior surface 60 of the at least one rib 46 may be curved along one or both of the first vertical side 56 and the second vertical side 58. Additionally or alternatively, in some embodiments, the exterior surface 60 of the at least one rib 46 may be curved along one or both of the first lateral side 52 and the second lateral side 54. As shown in FIG. 4B, in some embodiments, the first lateral segment 62 has a first height 72 and the second lateral segment 64 has a second height 74 which is different (e.g., greater) than the first height 72. Similarly, in some embodiments, the at least one rib 46 may additionally or alternatively have the first vertical segment 66 with a first width and the second vertical segment 68 with a second width which may be different than the first width. The configurations of the at least one rib 46 in FIGS. 2, 3A, 3B, 4A, and 4B provide examples of how the at least one rib 46 may be configured to conform to and properly fit within and provide structural support to the composite structure 20 and the present disclosure is not limited to the particular configurations of the at least one rib 46 shown in FIGS. 2, 3A, 3B, 4A and described above.

Referring to FIGS. 1-5, the at least one rib 46 is located within the cavity 26 between adjacent (e.g., laterally adjacent) spars of the plurality of spars 40. More specifically, the at least one rib 46 may be located within one or more sub-cavities 42 defined within the cavity 26 of the composite structure 20. For example, one or more of the sub-cavities 42 of the composite structure 20 may include one or more of the at least one rib 46. The present disclosure is not limited to any particular number of the at least one rib 46 included in the composite structure 20 or within a particular sub-cavity 42 of the cavity 26.

Figure 5:
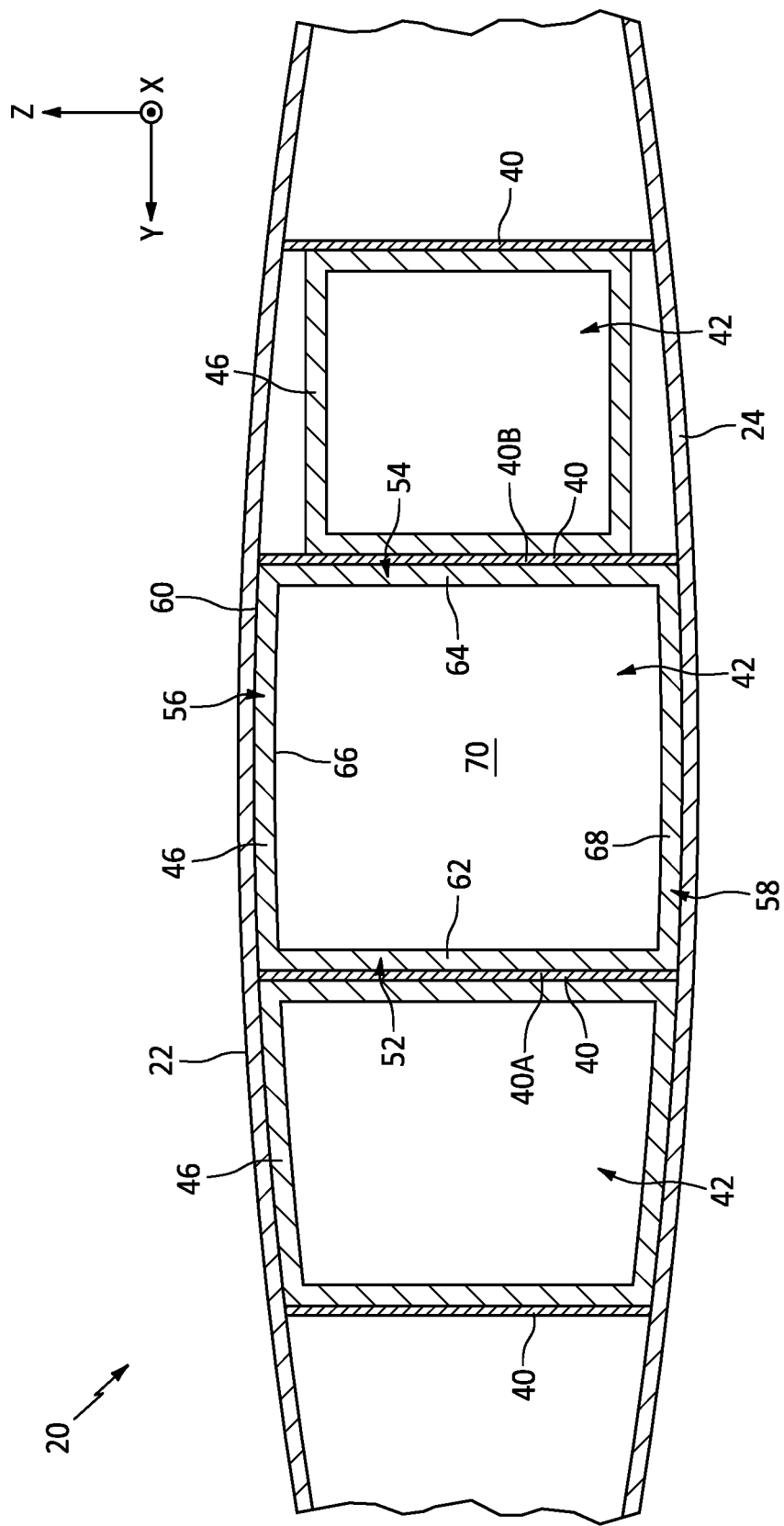
FIG. 5 illustrates a cross-sectional view of the composite structure of FIG. 1 taken along Line 5-5 and including exemplary ribs, in accordance with one or more embodiments of the present disclosure.

FIG. 5 illustrates a cross-sectional view of the composite structure 20 including exemplary ribs of the at least one rib 46 positioned therein and the present disclosure is not limited to the particular configurations of the at least one rib 46 shown in FIG. 5. The at least one rib 46 may be mounted to or otherwise in contact with each adjacent spar (e.g., a first spar 40A and a second adjacent spar 40B of the plurality of spars 40) of the plurality of spars 40 as shown in FIG. 5. For example, the first lateral segment 62 of the at least one rib 46 may be in contact with the first spar 40A while the second lateral segment 64 of the at least one rib 46 may be in contact with the second adjacent spar 40B. In some embodiments, the at least one rib 46 may additionally or alternatively be mounted to or otherwise in contact with the first composite skin 22 and/or the second composite skin 24. For example, the first vertical segment 66 may be in contact with the first composite skin 22 while the second vertical segment 68 may be in contact with the second composite skin 24.

Referring to FIGS. 1 and 5, in some embodiments, the composite structure 20 may have a change in shape, lateral width, vertical height, curvature, etc. along the extent of the composite structure 20 such as, for example, from the first longitudinal end 36 toward the second longitudinal end 38 and/or from the first lateral end 28 toward the second lateral end 32. For example, in some embodiments, one or more of the sub-cavities 42 within the composite structure 20 may be tapered such that a cross-sectional area (e.g., along a y-z plane, as shown in FIG. 5) of the one or more of the sub-cavities 42 decreases in a taper direction extending from the opening 44 (e.g., at the first longitudinal end 36) toward an opposing end of the one or more of the sub-cavities 42 (e.g., at the second longitudinal end 38). The tapering of the one or more of the sub-cavities 42 may be the result of, for example, a convergence of the first composite skin 22 with the second composite skin 24 and/or one or more spars of the plurality of spars 40 as shown, for example, in FIG. 1.

Figure 6:
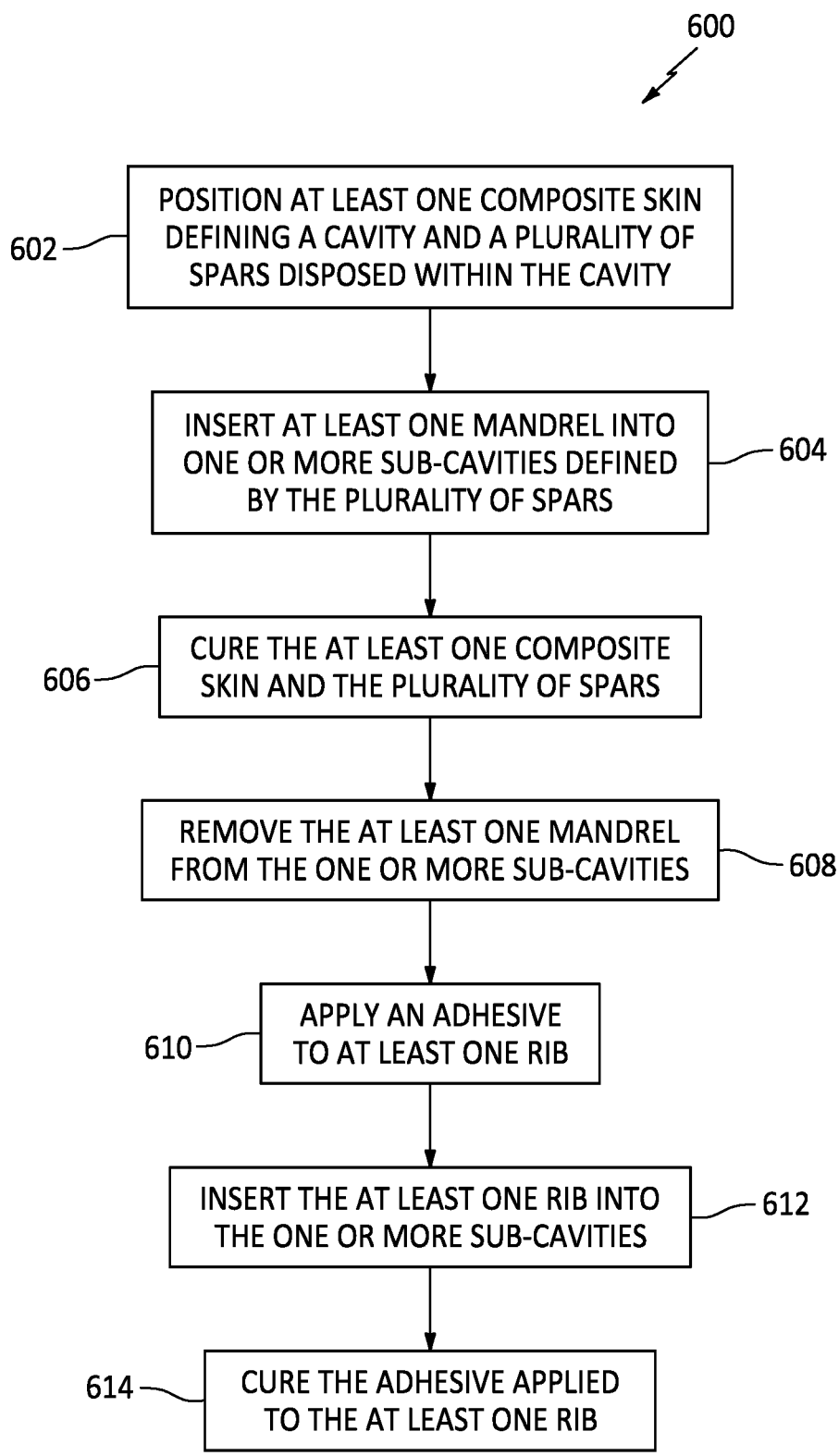
FIG. 6 illustrates a flowchart of a method for forming a composite structure, in accordance with one or more embodiments of the present disclosure.

Referring to FIGS. 5-8, the present disclosure includes a method 600 for forming a composite structure, such as the composite structure 20, as shown in the flow chart illustrated in FIG. 6. Unless otherwise noted herein, it should be understood that the steps of method 600 are not required to be performed in the sequence in which they are discussed below and steps of the method 600 may be performed separately or simultaneously.

Step 602 includes positioning the at least one composite skin and the plurality of spars 40 relative to one another in preparation for forming the composite structure 20, as described above. For example, step 602 may include positioning the first composite skin 22, the second composite skin 24, and the plurality of spars 40 so that the second composite skin 24 is spaced from the first composite skin 22 and the first composite skin 22 and the second composite skin 24 define the cavity 26 therebetween, and so that the plurality of spars 40 are located in the cavity 26 and laterally spaced from one another with the plurality of spars 40 extending between and connecting the first composite skin 22 and the second composite skin 24.

Figure 7:
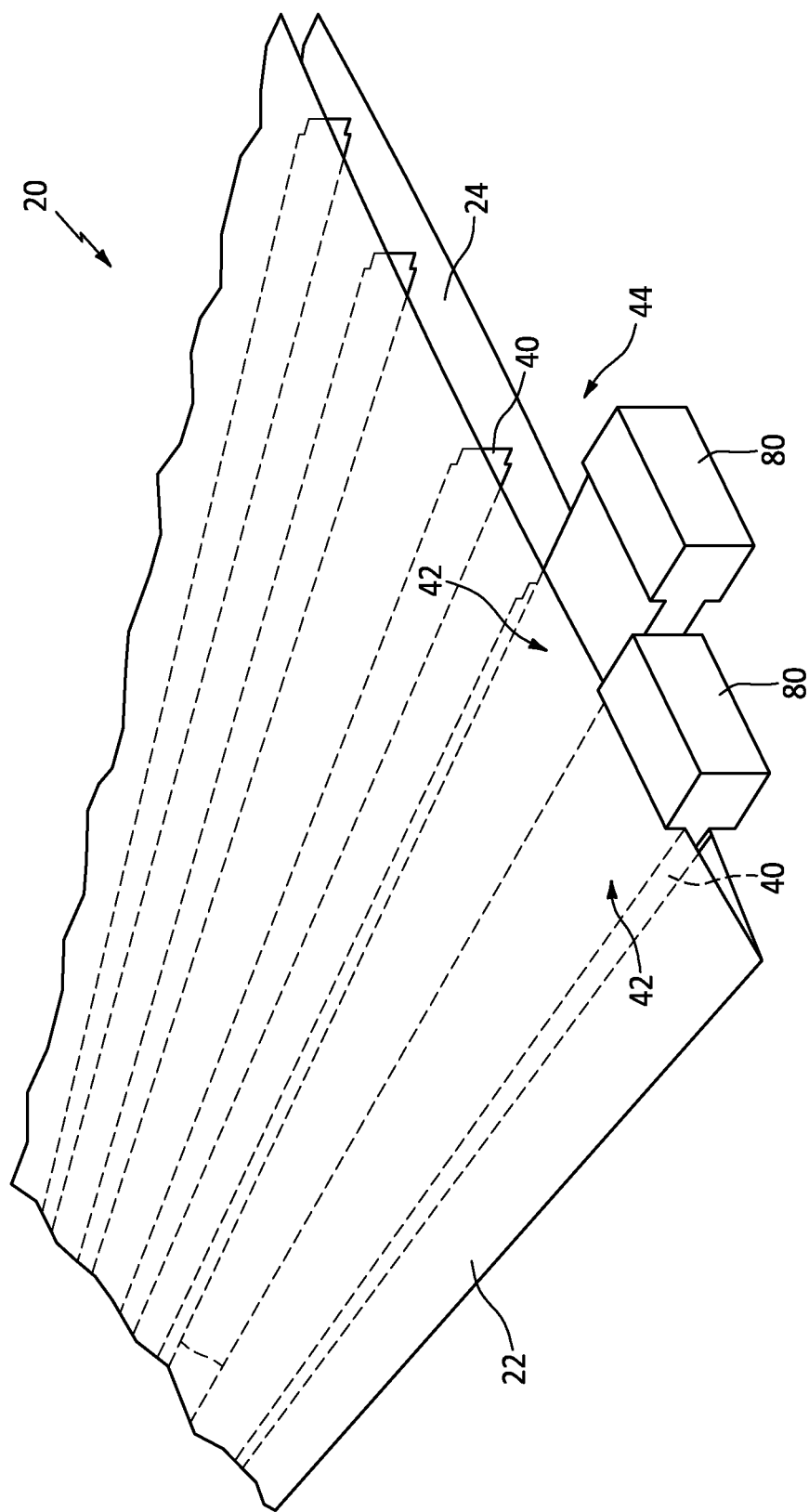
FIG. 7 illustrates a composite structure having exemplary mandrels at various stages of insertion therein, in accordance with one or more embodiments of the present disclosure.

In some embodiments, the method 600 may optionally include inserting at least one mandrel 80 in to one or more of the sub-cavities 42 defined by the plurality of spars 40, as provided in step 604 and shown in FIG. 7. The at least one mandrel 80 may be used to support the composite skins 22, 24 and the plurality of spars 40 during assembly and/or during a subsequent curing process. The at least one mandrel 80 may be inserted through the opening 44 and may extend through all or a substantial portion of a length of a respective sub-cavity 42. In some embodiments, positioning the composite skins 22, 24 and the plurality of spars 40 may additionally include the use of other internal and/or external tooling elements to support and maintain the position of the at least one composite skin and the plurality of spars 40.

Step 606 includes curing the composite skins 22, 24 and the plurality of spars 40. In some embodiments, the composite skins 22, 24 and the plurality of spars 40 may be co-cured (e.g., cured simultaneously) to form the composite structure 20. Curing the composite skins 22, 24 and the plurality of spars 40 may include heating the assembled composite skins 22, 24 and the plurality of spars 40 to an elevated temperature and holding the composite skins 22, 24 and the plurality of spars 40 at the elevated temperature for a sufficient time to cure the composite skins 22, 24 and the plurality of spars 40. Various temperatures, pressure, and curing times may be used, depending on the materials selected for the composite skins 22, 24 and the plurality of spars 40. The composite skins 22, 24 and the plurality of spars 40 may be cured, for example, in an oven or autoclave. The present disclosure is not limited to any particular curing temperatures, pressures, curing times, or equipment. In the cured state, the composite skins 22, 24 and the plurality of spars 40 form the composite structure 20.

In some embodiments, for example, where at least one mandrel 80 has been used to support the composite structure 20, the method 600 may include removing the at least one mandrel 80 from the sub-cavities 42 of the composite structure 20 once the composite structure 20 has sufficiently cooled and solidified, as provided in step 608.

In some embodiments, the steps 602, 604, 606, and 608 of method 600 may be performed during application a composite molding process. Various types of molding techniques may be used to construct composite components of an aircraft. For example, a resin pressure molding (RPM) technique or a Same Qualified Resin Transfer Molding (SQRTM) technique may combine pre-preg processing and liquid molding to produce composite components targeted to aerospace applications. As part of these techniques, pre-preg plies may be arranged within a mold, the mold may be closed, and then a resin may be injected into the mold. The resin maintains hydrostatic pressure within the mold. The present disclosure, however, is not limited to any particular composite formation technique or process for forming the composite structure 20.

Figure 8:
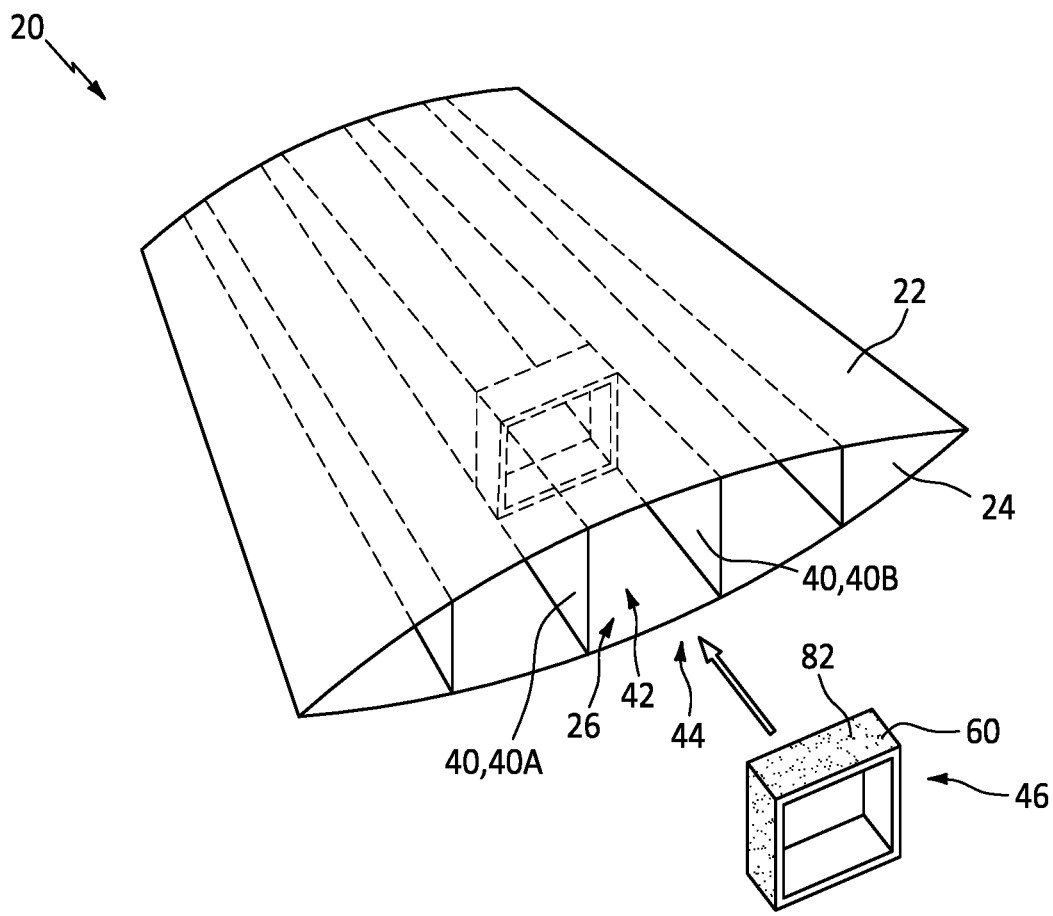
FIG. 8 illustrates the composite structure of FIG. 1 having a rib inserted therein, in accordance with one or more embodiments of the present disclosure.

In some embodiments, the method 600 may optionally include applying an adhesive to the at least one rib 46, as provided in step 610, prior to insertion of the at least one rib 46 into the composite structure 20. As shown in FIG. 8, for example, the adhesive (schematically illustrated as adhesive 82 in FIG. 8) may be applied to all or a portion of the exterior surface 60 of the at least one rib 46. The adhesive 82 may be used to ensure that the at least one rib 46 is securely bonded within the composite structure 20.

Step 612 includes inserting the at least one rib 46 into the cavity 26 of the composite structure 20 and, in particular, into one or more of the sub-cavities 42 of the composite structure 20, and positioning the at least one rib 46 within the composite structure 20 as described above. For example, step 612 may include inserting the at least one rib 46 into the cavity 26 between the first spar 40A and the second spar 40B so that the at least one rib 46 is mounted to or otherwise in contact with one or more of the first composite skin 22, the second composite skin 24, the first spar 40A, and the second spar 40B. Insertion of the at least one rib 46 into the composite structure 20 may be performed subsequent to curing the composite skins 22, 24 and the plurality of spars 40. In some embodiments, such as with embodiments of the composite structure 20 which have one or more tapered sub-cavities 42, as described above, the at least one rib 46 may be inserted into a respective sub-cavity 42 in the taper direction (e.g., a direction extending from the opening 44 toward an opposing end of the respective sub-cavity 42) in which the cross-sectional area of the respective sub-cavity 42 decreases, until the at least one rib 46 is tightly fitted within the respective sub-cavity 42 and in contact with one or more of the first composite skin 22, the second composite skin 24, the first spar 40A, and the second spar 40B.

In some embodiments, the method 600 may optionally include curing the adhesive applied to the at least one rib 46, as provided in step 614, subsequent to insertion of the at least one rib 46 into the composite structure 20. Similar to the curing process used for the composite skins 22, 24 and the plurality of spars 40, curing the adhesive may include heating the composite structure 20 to an elevated temperature and holding the composite structure 20 at the elevated temperature for a sufficient time to cure the adhesive. Various temperatures, pressure, and curing times may be used, depending on the particular adhesive selected. In some embodiments, the adhesive may not require the use of a curing process.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A method for forming a composite structure, the method comprising:

positioning a first composite skin, a second composite skin, and a plurality of spars so that the second composite skin is spaced from the first composite skin and the first composite skin and the second composite skin define a longitudinal cavity therebetween, and so that the plurality of spars are located in the longitudinal cavity and laterally spaced from one another with the plurality of spars extending between and connecting the first composite skin and the second composite skin, the first composite skin and the second composite skin extend between a first longitudinal end and a second longitudinal end opposite the first longitudinal end, the plurality of spars extend in a direction extending from the first longitudinal end toward the second longitudinal end, the plurality of spars define at least one longitudinal sub-cavity with each longitudinal sub-cavity of the at least one longitudinal sub-cavity located between each adjacent pair of spars of the plurality of spars, the first composite skin and the second composite skin define an opening of the at least one longitudinal sub-cavity at the first longitudinal end, and the at least one longitudinal sub-cavity is tapered such that a cross-sectional area of the at least one longitudinal sub-cavity decreases in a taper direction from the opening toward the second longitudinal end;

curing the first composite skin, the second composite skin, and the plurality of spars; and inserting at least one rib into the at least one longitudinal sub-cavity, in the taper direction, until the at least one rib contacts the first composite skin, the second composite skin, the first spar, and the second spar.

2. The method of claim 1, further comprising inserting a mandrel into one or more of the at least one longitudinal sub-cavity, prior to the step of curing the first composite skin, the second composite skin, and the plurality of spars.

3. The method of claim 2, wherein the step of inserting the at least one rib into the longitudinal cavity is performed subsequent to curing the first composite skin, the second composite skin, and the plurality of spars.

4. The method of claim 1, wherein the at least one rib includes a first lateral segment, a second lateral segment spaced from the first lateral segment, and a first vertical segment and a second vertical segment extending between and connecting the first lateral segment and the second lateral segment, the at least one rib defining a longitudinal passage between the first lateral segment, the second lateral segment, the first vertical segment, and the second vertical segment.

5. The method of claim 1, further comprising applying an adhesive to an exterior surface of the at least one rib prior to the step of inserting at least one rib into the longitudinal cavity.

\* \* \* \* \*